March 14, 1939.  J. E. LINDEMAN  2,150,742
HAND BRAKE MECHANISM FOR RAILWAY CARS
Original Filed April 26, 1935
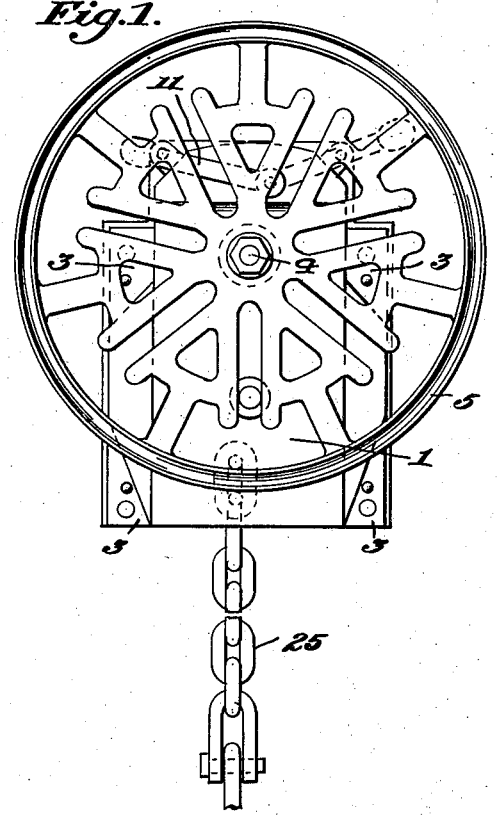
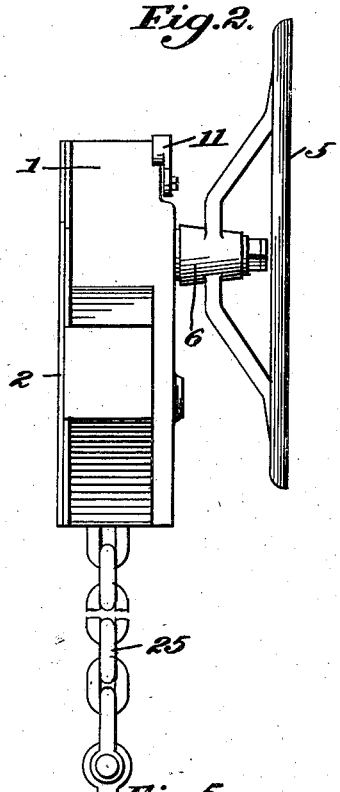
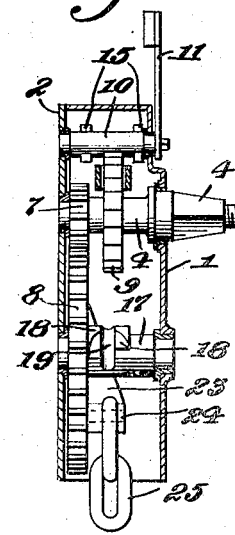
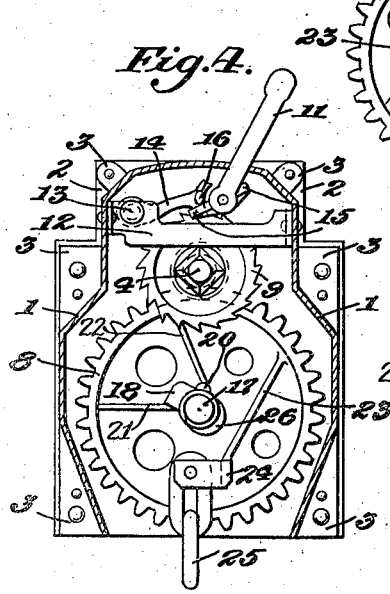
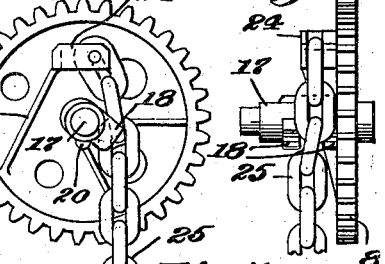
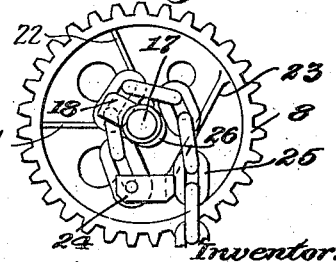
Inventor:
J. E. Lindeman,
Jas. L. Skidmore,
Att'y.

Patented Mar. 14, 1939

2,150,742

UNITED STATES PATENT OFFICE 2,150,742

HAND BRAKE MECHANISM FOR RAILWAY CARS

James E. Lindeman, Evanston, Ill., assignor, by mesne assignments, to Champion Brake Corporation, Wilmington, Del., a corporation of Delaware Application April 26, 1935, Serial No. 18,414
Renewed May 26, 1936

14 Claims. (Cl. 254—149)

This invention pertains to novel and improved means for quickly taking up the slack for safely and securely applying the necessary power in properly applying the brakes, associated with novel means for locking and releasing the hand brake shaft employed in connection with hand brake mechanism for railway cars, said last named means forming the subject-matter of a separate application filed under date of October 15, 1934, bearing Serial No. 748,408.

The prime object of this invention is to provide novel, simple, economical, practical, safe, and thoroughly efficient means for rapidly taking up the slack of the brake mechanism, whereby the brake applying mechanism is quickly and forcibly applied.

Another object of the invention is to provide an improved brake operating gear operating wheel or winding drum formed from a single casting and provided with integral means cooperating therewith for practically performing the important functions hereinafter referred to.

Further objects of this invention are to so design and construct my improved mechanism that the brake power is uniform throughout the chain travel of from seven inches to 18 inches; that the brake can be operated with one hand only, the leverage being so proportioned that the desired and required force is obtained by a minimum of exertion; that it will be impossible for the chain to foul; that the hand wheel is so designed as to prevent trainmen from reaching through between the spokes to operate the hand lever; that the hand release operating lever is arranged to throw to left when in applied position and to the right for release; that it will insure release of the brake when tension is removed from the ratchet and positive connection is provided between the operating lever and ratchet so that the pawl may be forced to the release position by hand when necessary, and the ratchet release lever and pawl are so disposed with relation to each other that the pawl will be automatically released from the ratchet wheel when the brake wheel is moved in the direction of application sufficiently to release the pawl of its entire load.

The foregoing and such other objects as may appear from the ensuing description are accomplished by the construction, arrangement, location, combination and association of the several parts hereinafter more fully described, illustrated in the accompanying drawing and more particularly pointed out in the claims appended hereto, it being understood that slight changes in the precise shape, proportions and minor details of the construction may be resorted to without departing from the spirit or sacrificing any of the advantages of the invention.

In the accompanying drawing forming a part of this specification it will be seen that:

Figure 1 is a front elevation of the means embodying my invention.

Figure 2 is a side elevation thereof.

Figure 3 is a central vertical section taken through the housing with the hand operating wheel removed therefrom.

Figure 4 is a vertical section through the housing with the hand wheel removed, showing in front elevation the mechanism within the housing.

Figure 5 is a front elevation of the chain winding wheel or drum removed from the housing and showing said wheel turned to one hundred and eighty degrees in the direction of the arrow from the position shown in Fig. 4.

Figure 6 is a side elevation of the means shown in Fig. 5, and

Figure 7 is a front elevation of Fig. 5 with the wheel turned in the direction of the arrow to three hundred and sixty degrees or one complete revolution.

In the embodiment of my invention as illustrated it will be seen that the numeral 1 indicates the front steel or cast malleable iron cover plate of the housing for inclosing and protecting the braking mechanism disposed between the front plate and rear plate 2 and supported by said plates, the front plate having a plurality of outward extensions 3, both plates having suitable openings for the reception of rivets for firmly securing the plates together, and larger openings therethrough for the reception of suitable bolts or rivets for rigidly securing the housing to one end of the car.

Suitably supported within the housing is the main operating shaft 4, to the outer end of which is fixedly secured the hand operating wheel 5 provided with a hub 6 fitted to the extended squared portion of said shaft 4, while to the inner end portion of the shaft is fixedly secured a pinion 7 adapted to mesh with the main chain operating wheel 8 or chain winding drum hereinafter described, and intermediate of the shaft 4 within the housing is a ratchet wheel 9 integral with said shaft 4.

Disposed above the shaft 4 and supported within the housing is another shaft 10, to the outer end of which is suitably secured a metallic handle member 11 formed with an excess of metal at its upper end portion, and to each side portion of the housing is fixedly riveted a metallic casting or member 12 formed with an opening therethrough for the reception of a pin 13 to which is loosely pivoted the locking pawl 14 disposed between the side walls of said member 12.

It will be perceived that the upper portion of the ratchet wheel 9 projects upwardly within the member 12 between the side walls thereof, so that the locking and releasing pawl 14 and the ratchet wheel are always maintained in perfect alinement with each other, while the integral projecting formations 15 formed on the shaft 10 straddle the member 12, the said pawl being adapted to ride over the ratchet wheel while applying the brake and to have locking engagement therewith when the brake shall have been properly applied as shown in Fig. 1 of the drawing, with the handle member sufficiently beyond its vertical center to insure automatic release of the pawl when tension is removed from the ratchet by a pull on the hand wheel, the weighted handle lever 11 being in the position shown by dotted lines in said Fig. 1, will cause further movement to said lever to the right and simultaneously lift the locking pawl from locking engagement with the ratchet wheel by contact of the projections 15 formed on the shaft 10 with each of the lateral extensions 16 formed at each side of the outer end portion of the pawl 14 and lifting the said pawl out of engagement with the ratchet wheel, its upward movement being limited by contact with the top of the housing.

It will be seen by reference to Figs. 3 and 4 that the projections 15 are formed integral with the shaft 10, said projections being so disposed that when the lever 11 is moved to the right said projections will contact with the lower face of the extensions or ears 16 formed on the outer end portion of the pawl 14, thereby releasing said pawl from engagement with the ratchet wheel 9, and when the lever 11 is moved to the left, as shown in Fig. 1, the projections 15 will engage the upper face of said extensions or ears 16 and force the pawl into engagement with the ratchet wheel 9.

Supported within the housing below the shaft 4 is disposed my novel and improved chain winding wheel or drum 8 formed from a single casting of high grade steel, said single casting or wheel including gear teeth around its peripheral portion for meshing with the pinion 7; a centrally disposed shaft 17 formed with extensions 18 having their inner faces beveled inwardly and adapted to guide one of the chain links into a groove 19 formed within the face of the shaft crosswise thereof; a hump or rib member 20 formed across one end portion of said groove; a wheel bracing and strengthening rib 21 extending from the shaft to the peripheral portion of the wheel or drum 8, another rib 22 slightly inclined outwardly from its peripheral portion to the shaft; a chain link guiding member 23 inclined downwardly and outwardly from the peripheral portion of the wheel 8 to a box-like member 24 formed on the outer face of said wheel within which is loosely secured the end link of the brake chain 25 by a pin which passes through the member 24 and rigidly secured thereto, said guiding member 23 terminating at its lower end flush with the outer face of the member 24, as is clearly shown in Fig. 3 of the drawing; and an excess of metal 26 is formed around the shaft oppositely disposed with relation to the groove 19 and terminating with the outer face of the wheel 8 to insure the necessary strength of the shaft 17, and thus compensate for the groove formation 19 within said shaft, as is clearly shown in Figs. 4, 5 and 7 of the drawing.

It will be readily obvious that when the hand wheel is turned sufficiently to cause the chain winding wheel to assume the position shown in Figs. 5 and 7 the lower end portion of the second link of the chain will be seated against the beveled portions of the extensions 18 with the upper portion and a part of the body portion of the third link resting within the groove 19, while the lower end portion of said third link will contact with the hump or rib 20 which is so disposed as to be straddled by the fourth link, thereby preventing the bending of the lower end portion of said third link, so that when the chain winding wheel is caused to make one complete revolution the inclined member 23 has forced the chain laterally beyond the extensions 18 and the member 24 and the further winding of the chain thereby continued around the shaft 17 between said projection 18 and the inner face of the front plate of the housing, thus avoiding all fouling of the said chain 25.

By the construction and arrangement hereinbefore described it will be seen that a quick take-up of the slack is attained by a one-half revolution of the wheel and the chain guide member 23 prevents the chain from fouling by a lateral shift of the chain, and one of the links rests within the groove 19 nearer the center of the shaft, thereby enabling the brakeman to obtain greater power in applying the brake, the braking strain being transferred from the first link pulling from the outer side of the wheel near its peripheral portion where greater resistance is met to the shaft, and after the usual slack of from seven to seven and a half inches is taken up the chain is shifted to the main body portion of the shaft at one side of the projections and box-like member 24, thus a uniform pull is obtained from seven or eight inches to eighteen inches.

When it is desired to release the brake it is simply necessary to exert a pull on the hand wheel as in applying the brake until the load is released and the weight of the lever will immediately cause the projections 15 formed on the shaft 10 to lift the locking pawl out of engagement with the ratchet wheel, and should an emergency arise the brake may be released by exerting sufficient pressure against the weighted lever to force the locking pawl out of engagement.

While I have shown a special form of housing in connection with my braking mechanism, it will be understood that any type of housing may be utilized that will properly serve to support and protect the mechanism employed.

It will be understood that the several parts and members forming my improved braking mechanism may be formed of any suitable or desirable dimensions, and of any material possessing the requisite strength and durability for the practical purposes for which they are intended.

Having thus described my invention, what I claim and desire to secure by Letters Patent is:

1. Hand brake mechanism for railway cars, comprising a housing, a vertically disposed operating wheel supported by said housing, and a brake chain operating wheel journaled within the housing formed from a single casting having gear teeth around its periphery, a shaft formed with a cross groove therein adjacent the outer face of the wheel, means for guiding a chain link to and within the groove, a box-like member within which the end link of the chain is secured, and means for transferring the braking strain from the outer side of the wheel to the said shaft.

2. Hand brake mechanism for railway cars, comprising a housing, a brake chain operating wheel journaled within the housing, said wheel consisting of a single casting, including gear teeth formed around its periphery, a shaft formed with a cross groove disposed within the shaft adjacent the outer face of the wheel, means projecting from the shaft adjacent the wheel for guiding a chain link to the groove, a box-like member formed on the outer face of the wheel for the reception of the end link of an operating chain, and means adapted to transfer the braking strain from the outer side of the wheel to the said shaft.

3. In a hand brake operating mechanism of the character described including a housing, a chain winding wheel mounted within the housing and means for operating the wheel, said wheel consisting of a single casting, a shaft having a crosswise groove formed therein, beveled projections formed on the shaft for the reception of one of the links of the chain, a rib or hump formed at one end of the groove, a box-like member formed near the peripheral portion of said wheel, and an inclined member extending from the peripheral portion of the wheel to the outer face of said member for shifting the chain laterally beyond said projections and member.

4. In hand brake mechanism of the character described including a chain winding wheel formed from a single casting, a shaft, a groove formed within the shaft for the reception of a portion of one of the links, an outward beveled extension formed on the shaft at each side of the groove for the reception of another chain link, a box-like member formed on the outer face of the wheel body portion, and an inclined member extending from the peripheral portion of the wheel to the outer face of the box-like member adapted to guide the chain laterally beyond the projections and box-like member.

5. In a hand brake mechanism of the character described, a chain winding wheel or drum consisting of a single casting having a shaft member, a box-like member on the outer face of the wheel, inwardly beveled projections formed on said shaft, a crosswise groove formed within the face of the shaft for the reception of one link of the chain, and a chain guiding member extending from the peripheral portion of the wheel to the outer face of the box-like member adapted to force the chain outwardly beyond the said projections and box-like member onto the shaft.

6. In a brake operating mechanism of the character described including a housing, a chain winding wheel mounted within the housing and means for operating the wheel, said wheel consisting of a single piece of metal formed with a shaft member, projections beveled upon their adjacent faces formed on the shaft, a crosswise groove formed within the face of the shaft for the reception of one of the chain links, a rib extending across one end of the groove to contact with one end portion of a link, a box-like member formed on the body of the wheel near its peripheral portion, and an inclined guiding member extending from the peripheral portion of the wheel to the outer face of the box-like member adapted to force the chain laterally beyond said projections and box-like member onto the shaft between the projections and housing.

7. In a hand brake mechanism of the character described including a housing, a chain winding wheel mounted in the housing, and means for operating the wheel, said wheel being formed from a single piece of metal having a shaft member, beveled projections formed on the shaft adjacent the body of the wheel, a crosswise groove formed in the shaft between said projections, a box-like member formed on the outer face of the wheel within which one end of the chain is connected, and an inclined chain guide member adapted to force the chain laterally beyond said projections and box-like member.

8. In a hand brake mechanism of the character described, a housing, a chain winding wheel journaled within the housing and means for operating the wheel, said wheel consisting of a shaft member formed with two beveled projections adjacent the body portion of the wheel, a crosswise grooved formation within the face of the shaft and disposed between said projections, a box-like member disposed on the outer face of the body portion of the wheel within which one end of a chain is secured, and a chain guide member extended from the peripheral portion of the wheel and terminating flush with the outer face of said box-like member adapted to force the chain laterally onto the shaft between the said projections and housing.

9. In a hand brake mechanism of the character described, a housing, a chain winding wheel mounted within the housing with means for operating the wheel, said wheel consisting of a single casting, a shaft having two beveled projections adjacent the wheel, a crosswise groove within the face of the shaft and disposed between said projections adjacent the body of the wheel, a rib formed at one end of said groove, a box-like member formed on the inner face of the body portion of the wheel within which one end of the chain is secured, and an outwardly inclined chain guide member adapted to force the chain laterally beyond said projections and box-like member as the brake is being applied.

10. In a hand brake mechanism of the character described, a housing, a chain winding wheel mounted within the housing with means for operating the wheel, said wheel comprising a single casting, a shaft having a pair of separated beveled projections adjacent the body portion of the wheel, a crosswise groove formed within the face of the shaft between the projections, a box-like member formed on the outer face of the wheel within which one end portion of the chain is secured, and a chain guide member extending outwardly from the outer face of the wheel and inclined outwardly for forcing the chain laterally beyond the projections and box-like member while the brake is being applied.

11. In a hand brake mechanism of the character described, a housing, a chain winding wheel mounted within the housing with means for operating the wheel, beveled projections formed on the shaft adjacent the body portion of the wheel, a crosswise groove formed in the face of the shaft said projections, a rib formed across one end portion of said groove, two strengthening ribs radiating from the shaft to the peripheral portion of the wheel, a box-like member formed on the outer face of the wheel within which one end of a chain is secured, and a chain guide member inclined outwardly terminating flush with the outer face of the box-like member for forcing the chain laterally, thereby preventing fouling of the chain during its winding operation.

12. Brake operating mechanism for railway cars, comprising a housing, a brake chain operating wheel journalled within the housing, means supported by the housing for rotating said wheel, said wheel having a hub provided with a laterally extending shaft part, said shaft part having a cross groove therein extending only part way around the shaft adjacent the outer face of said wheel to receive a portion of a chain so as to bring the chain closer to the axis of the wheel at the groove than at the remaining portion of its periphery, chain securing means on said wheel adjacent the periphery thereof, said cross groove being positioned in the side of the shaft approximately where the chain engages the shaft when said chain securing means is at its topmost position, and guide means on said wheel preventing double winding of the chain over said groove.

13. Brake operating mechanism for railway cars, comprising a housing, a brake chain operating wheel journalled within the housing, means supported by the housing for rotating said wheel, said wheel having a hub provided with a laterally extending shaft part, said shaft part having a cross groove therein extending only part way around the shaft adjacent the outer face of said wheel to receive a portion of a chain and located in such position circumferentially of the shaft as to bring the chain closest to the axis of the wheel where it first starts to wind on the shaft, chain securing means on said wheel adjacent the periphery thereof, and means for guiding a chain link into said groove.

14. Hand brake locking and releasing mechanism for railway cars, comprising a housing, a main brake operating shaft having a pinion and a ratchet wheel thereon, a frame disposed within the housing crosswise thereof and secured thereto, a pawl loosely pivoted within the frame and adapted to engage said ratchet wheel to prevent rotation of said shaft in one direction, a member rotatably mounted in said housing comprising spaced arms adapted to straddle the pawl, lateral extensions on said pawl near its free end adapted to be engaged by said arms for forcing the pawl into engagement with the ratchet wheel, and a handle for rotating said member.

JAMES E. LINDEMAN.